United States Patent [19]
Dorenbosch et al.

[11] Patent Number: 6,023,230
[45] Date of Patent: Feb. 8, 2000

[54] METHOD AND APPARATUS FOR EFFECTING CHANNEL ACQUISITION

[75] Inventors: Jheroen Pieter Dorenbosch, Paradise; Terence Edward Sumner, Azle; Charles Louis Alain Brianson, Southlake, all of Tex.

[73] Assignee: Motorola, Inc., Schaumburg, Ill.

[21] Appl. No.: 08/921,098

[22] Filed: Aug. 29, 1997

[51] Int. Cl.[7] .................................................. G08B 5/22
[52] U.S. Cl. .................... 340/825.44; 455/133; 455/450; 455/512; 455/513; 370/336
[58] Field of Search ........................ 340/825.44, 825.47, 340/825.49, 825.27, 825.03, 825.04, 825.5, 825.51; 455/38.1, 54.2, 88, 186.1, 434, 450, 512; 379/59, 58, 57; 375/344; 370/412, 336, 468, 337, 329, 444

[56] References Cited

U.S. PATENT DOCUMENTS

| | | | |
|---|---|---|---|
| 4,849,750 | 7/1989 | Andros et al. | 340/825.44 |
| 4,881,073 | 11/1989 | Andros et al. | 340/825.44 |
| 4,897,835 | 1/1990 | Gaskill et al. | 340/825.44 |
| 4,935,732 | 6/1990 | Andros et al. | 340/825.44 |
| 5,206,855 | 4/1993 | Schwendeman et al. | 340/825.44 |
| 5,729,540 | 3/1998 | Wegrzyn | 370/336 |
| 5,787,358 | 7/1998 | Takahashi | 455/512 |
| 5,809,427 | 9/1998 | Perreault et al. | 455/513 |
| 5,852,780 | 12/1998 | Wang et al. | 455/450 |

*Primary Examiner*—Brian Zimmerman
*Assistant Examiner*—Jean B. Jeanglaude
*Attorney, Agent, or Firm*—Charles W. Bethards

[57] ABSTRACT

Methods of and corresponding apparatus for scheduling messages on an operating channel (223) in a selective messaging system (200) for a messaging unit (235) include scheduling a first message, including a channel priority indication (511), addressed to the selective messaging unit on a first channel, and then scheduling a second message for the selective messaging unit on a second channel (225) selected as an alternative operating channel. Analogously at the selective messaging unit a method of selecting an operating channel includes monitoring the first channel for a message addressed to the selective messaging unit; detecting as part of the message the indication; and responsive thereto discontinuing monitoring the first channel and then scan for the second channel.

28 Claims, 5 Drawing Sheets

METHOD AND APPARATUS FOR EFFECTING CHANNEL ACQUISITION

FIELD OF THE INVENTION

This invention relates generally to communication systems and more specifically but not limited to methods and corresponding apparatus for effecting channel acquisition.

BACKGROUND OF THE INVENTION

Communications systems, especially messaging and paging systems, typically operate on a channel having a specified radio frequency for a subscriber's home location. These systems are viable solutions as long as the channel and radio frequency have the spectral capacity to accommodate or provide service to all subscribers or users of the system. As the number of subscribers and the mobility of those subscribers increase, these systems may begin to experience difficulties. Adding capacity may require additional channels and radio frequencies. Assuming the demands for capacity can be met at one or another location, subscribers traveling between locations typically find that the two locations do not share a common radio frequency or channel. These subscribers may be required to carry and maintain a messaging unit or pager for each of the locations the subscriber might be traveling to, or one pager that can be adjusted to each local channel. This is a constraint and significant inconvenience for subscribers that need messaging or paging coverage in multiple locations.

As subscribers demanded messaging and paging service in multiple areas, practitioners sought solutions that provided the subscriber the ability to move between paging areas and have the convenience of carrying a single subscriber unit. This demand and these concerns spawned the concept of roaming in the paging industry or for paging systems. Roaming relates to the ability of a subscriber to have service in a paging area known as a home area, and additionally have the option of temporarily extending this service outside of the home area.

Messages for the subscriber are ordinarily sent by the home system on the home system channel and radio frequency to the subscriber. When a subscriber knows they will be traveling out of the home area, they contact the service provider via telephone to advise the provider as to when and where the subscriber expects to travel. With this information the service provider forwards messages for the subscriber to those areas being visited during the times agreed upon. Capacity on the home system and other areas is not wasted as the message need not be broadcast in the home area or other areas when the service provider knows the subscriber is not present.

Messaging units operating on multiple frequencies have been built. These multiple frequencies represent valid frequencies in various paging systems and allow the messaging unit to operate in or roam to systems with different frequencies; however the messaging unit needs to be tuned, typically manually, to the proper channel. The concept of roaming relies on the cooperation and coordination of both the service provider or system and the subscriber or unit to ensure the continuity of service over multiple service areas for specified periods of time. Prior art has provided for roaming that included coverage within the home area and roaming areas by ensuring that messages are sent to all the different coverage areas the subscriber might be located in at least during the apparent roaming times, but this may waste system capacity.

Potential issues arise when the subscriber can receive channels from more than one system, such as the home system and either one or more roaming or other systems at the same time. The system inefficiently uses airtime by sending duplicate messages to multiple controllers or systems, or alternatively messages may be missed if the messaging unit is tuned to a channel other than the channel the system is using. Also, if the messaging unit has scanning capability, the unit can waste valuable battery resources scanning multiple systems attempting to determine the most appropriate channel to tune to.

Roaming systems suitable to mitigate some of these issues have been proposed by Gaskill, et al. U.S. Pat. No. 4,897,835. Gaskill et al. suggests that the messaging system tells the messaging unit to tune to a particular channel. Subsequent messages are broadcast only on that channel frequency. Drawbacks to Gaskill include sending the tuning message on all channels the messaging unit may be on, thus wasting capacity, and the possibility that the messaging unit does not receive the tuning message thus missing subsequent messages.

Clearly a need exists to automatically allow a system and a messaging unit to adequately and routinely modify and effect the operating channels available to subscribers.

BRIEF DESCRIPTION OF THE DRAWINGS

The features of the present invention that are believed to be novel are set forth with particularity in the appended claims. However, the invention together with further advantages thereof, may best be understood by reference to the accompanying drawings wherein:

DETAILED DESCRIPTION OF A PREFERRED EMBODIMENT

Figure 1:
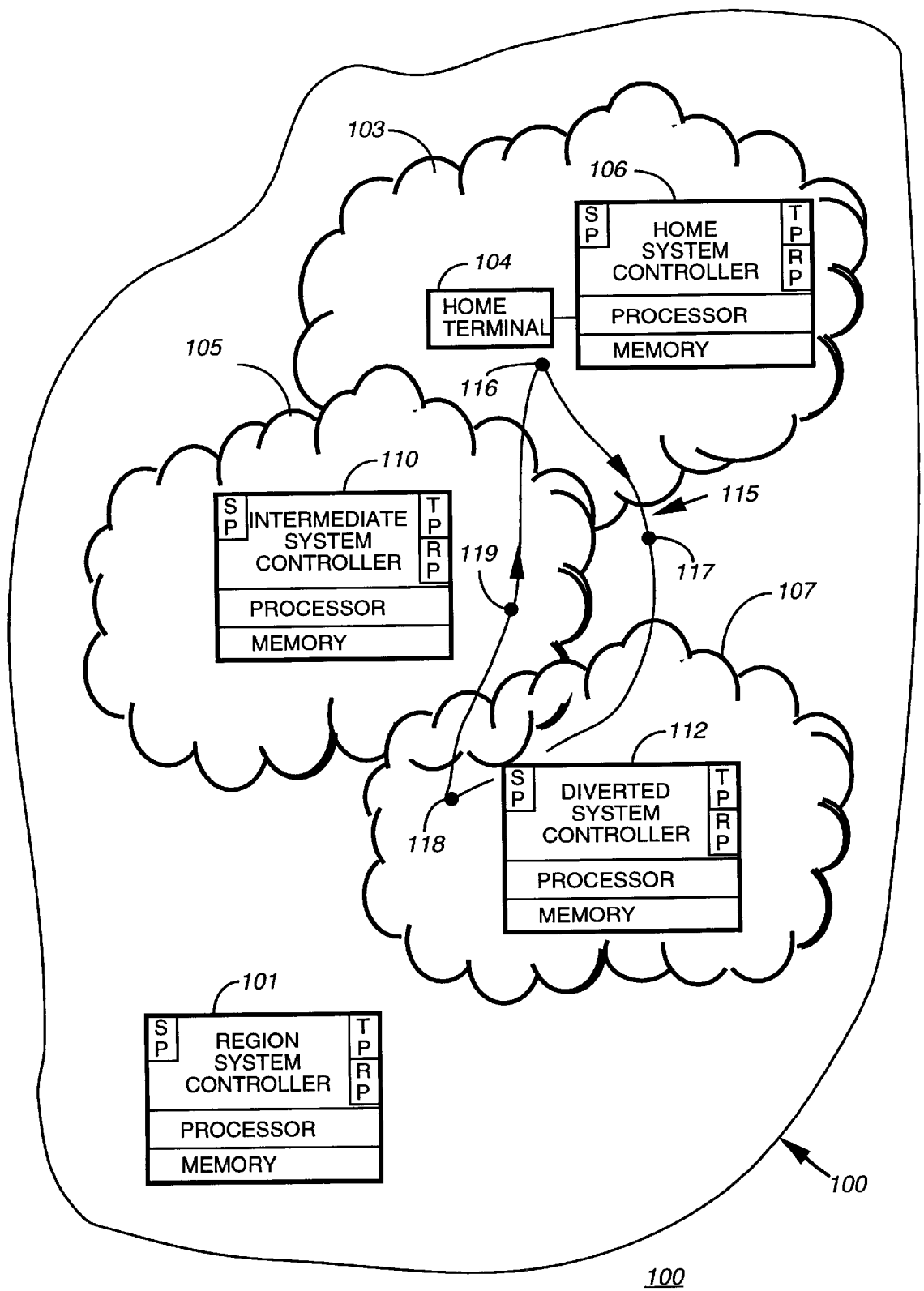
FIG. 1 is an illustrative coverage map for a plurality of messaging systems.

The present disclosure concerns communications systems, such as selective messaging systems arranged to provide relatively wide area coverage using multiple frequencies and more specifically methods and apparatus for use in such systems. In a preferred embodiment, set in a selective messaging unit, a method of selecting an operating channel includes monitoring a first channel for a message intended for or addressed to and preferably addressed only to the selective messaging unit; detecting as part of the message an indication during the step of monitoring; discontinuing, responsive to that indication, the monitoring; and then scanning or searching for a second channel to use as the operating channel.

Preferably the method includes providing a list of potential operating channels that includes the first and second channel. In one form the indication is a priority command, such as a preference or priority index corresponding to various channels. The list of channels is modified in accordance with this priority command to provide a modified list, and then the step of scanning for channels within the modified list to provide the second channel is preferred. In many instances the best or most likely channel to use as an operating channel or a second channel will be a channel, such as one corresponding to or providing coverage at a diverted or destination location, a previous location, or an intermediate location. The step of discontinuing or the start of the scanning step may be undertaken at a time corresponding to information within the indication. Alternatively the indication may be interpreted as an affirmation signal to remain on the current channel and the scanning step thus foregone.

An alternative embodiment is set in a selective messaging system and is a method of scheduling messages on an operating channel for a selective messaging unit. The method includes first scheduling a first message for or addressed to the selective messaging unit on a first channel, the first message including a channel priority indication corresponding to this first channel thus causing the unit to scan; and second scheduling a second message for the selective messaging unit on a second channel, the second channel selected as the operating channel from a plurality of channels as an alternative to the first channel. This second channel will also be selected by the unit during its scan.

Preferably the step of second scheduling includes scheduling the second message on each channel or other subset of the plurality of channels. The plurality of channels is included as a part of a list of potential operating channels for the unit provided for example to the system by a system operator at the time of service initialization. The step of first scheduling preferably further includes formulating the channel priority indication to correspond to a relative priority of channels within the plurality of channels. In certain conditions it will be advantageous to schedule the second message on a channel for a diverted location, or a previous location, or an intermediate location. The second scheduling step is preferably conducted or undertaken at a time determined to correspond to or derived from the channel priority indication.

A corresponding apparatus embodiment of the present invention is a selective messaging unit arranged and constructed for selecting an operating channel. This selective messaging unit includes a receiver for monitoring a first channel for a message intended for the selective messaging unit and a controller, coupled to the receiver, for detecting as part of the message an indication and responsive thereto causing the receiver to discontinue monitoring the first channel and then scan for a second channel to use as the operating channel. Preferably, the selective messaging unit also includes a memory for storing a list of potential operating channels, the list including the first channel and the second channel. The indication, preferably, includes a priority command that will be used to modify the list accordingly thus providing a modified list. The controller then cooperatively with the receiver scans channels corresponding to the modified list to provide the second channel. Channels included in the list or modified list may advantageously include a channel for or corresponding to a diverted, roaming or remote location, or a previous or local location, or an intermediate or transition location. The scanning for a new or alternative operating channel or more particularly discontinuing monitoring the first channel is, preferably, done or undertaken at a time determined to correspond to the indication. Alternatively the indication may be interpreted as an affirmation of the first channel as an operating channel in which case the scanning step would be foregone.

A further embodiment is a messaging system controller adapted for scheduling messages on an operating channel for a selective messaging unit. The messaging system controller includes a processor for scheduling a first message for the selective messaging unit on a first channel, the first message including a channel priority indication or priority indication or simply indication corresponding to the first channel; thereafter the processor schedules a second message for the selective messaging unit on a second channel, the second channel selected as the operating channel from a plurality of channels as an alternative to the first channel; and a transmitter port for coupling the first message and the second message to respective or corresponding transmitters. The second message is preferably scheduled by the processor on each channel of the plurality of channels at least for some period of time after which the processor may schedule the second message or messages thereafter on only one channel of the plurality of channels.

The system controller preferably includes a memory or database for storing a list of potential operating channels for the selective messaging unit as well as all other messaging units in the system, where these lists include the plurality of channels corresponding to each messaging unit. The processor while first scheduling, preferably, further formulates the channel priority indication to correspond to a relative priority of channels within the plurality of channels. The processor may advantageously schedule the second message on a channel for a diverted or remote location, or a previous or local location, or an intermediate or transition location and at a time determined to correspond to the channel priority indication.

For a clearer understanding of the present disclosure the reader is referred to the FIG. 1 representative messaging system coverage map. A region wide area or location (100) serviced by a region wide channel or frequency represents and provides system coverage for a selective messaging unit in or throughout a region wide geographic area. The regional system controller (101) operates to schedule messages for the selective messaging units within the region. The home area or location (103) and thus home channel or frequency represents and provides by way of a home terminal (104) and a system controller (106) operating together, messaging system coverage for a subscriber or pager or selective messaging unit in a home or local or normal geographic location. This home area may be a previous location for the selective messaging unit if the unit is transported or otherwise redirected to another system's coverage area. When the subscriber or pager or selective messaging unit desires to obtain messaging coverage outside of the home location, a form of roaming capability allows for coverage in a remote, roaming, or diverted location (107) via a diverted or roaming frequency and channel. The diverted system controller (112) cooperatively works with the home terminal (104) via leased telephone lines, radio, or satellite links to facilitate the roaming operation. The intermediate system controller (110) works with the home terminal (104) as the subscriber or pager or selective messaging unit travels between the home area, and the diverted or roaming or remote location (107), to provide coverage in the intermediate location (105) on a corresponding frequency and operating channel.

Various concerns or issues, arising as a result of these overlapping coverage areas, many that are or may be addressed by the inventive principles developed herein will be more apparent if we consider the circumstances faced by a selective messaging unit as it traverses path (115) beginning at the home point (116). At point (116) coverage is preferably provided by the home system thus reserving capacity in other systems such as the region wide system (100) for traffic or messages that must use those systems. As our selective messaging unit moves or roams to point (117) home system coverage is lost and the regional system with coverage area (101) must or should handle any messages for the selective messaging unit. Continuing at point (118), messages for our selective messaging unit are preferably handled by the diverted or remote system and at point (119) by the intermediate system (110). The balance of these discussions will be directed to various inventive principles and operations for fulfilling or insuring that selective messaging units have appropriately selected operating channels such that messages for the unit may be delivered on the appropriate system thus avoiding undue capacity inefficiencies.

Figure 2:
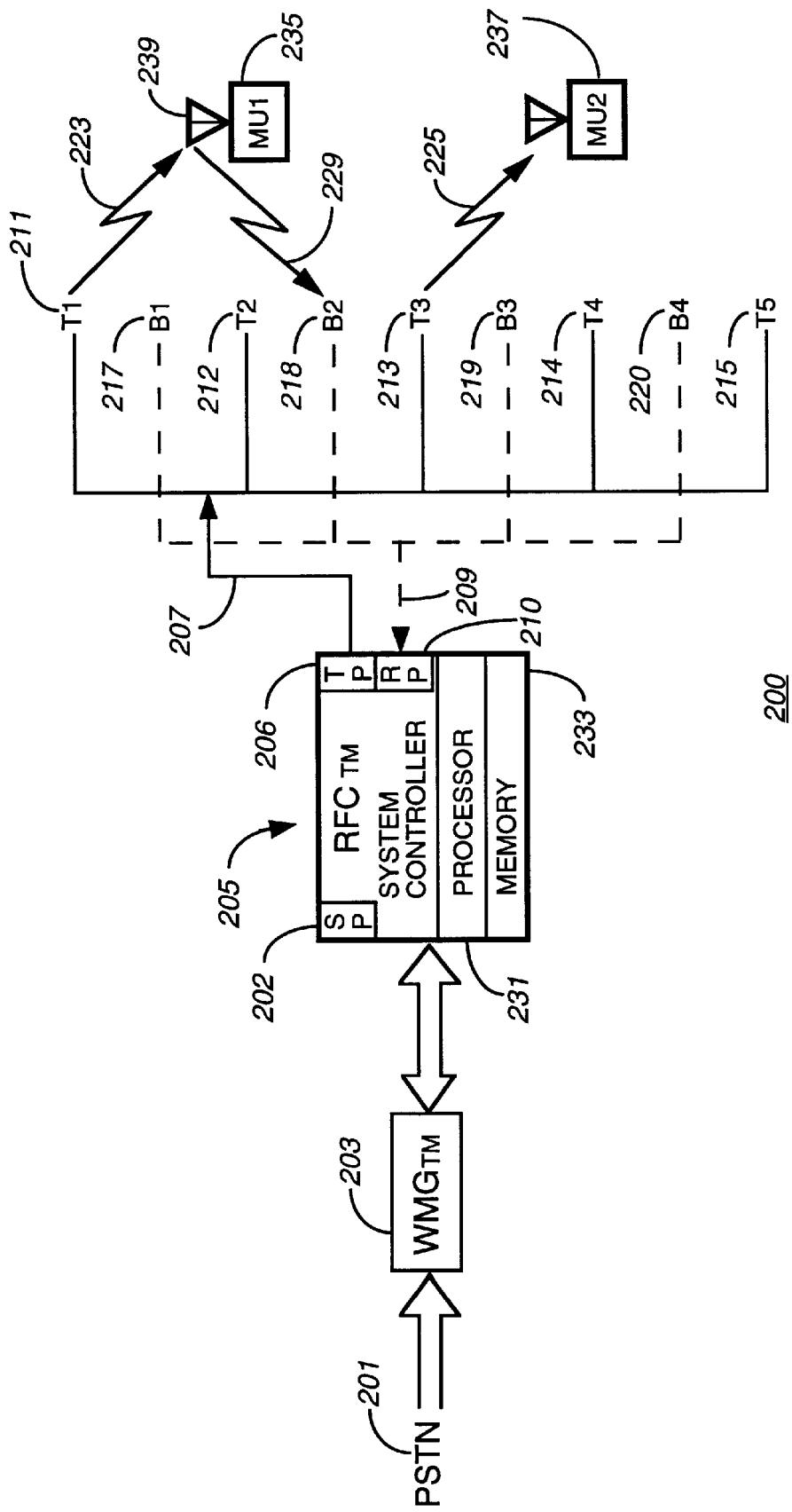
FIG. 2 is a block diagram of a selective messaging system suitable for employing an embodiment of the instant invention.

Continuing the present disclosure the reader is referred to the FIG. 2 depiction of a representative paging or messaging system (200), preferably, a selective one-way messaging system, but alternatively a two-way messaging system, communicating with a plurality of messaging units (235, 237). The messaging system (200) includes a gateway or terminal (203), exemplified by the home terminal (104), coupled to a message source such as the public switched telephone network (201). The terminal (203) is available from Motorola as the WMG™ product as well as from other manufacturers. The terminal is coupled to, often collocated with, a system controller or controller (205), such as a Motorola RF CONDUCTOR™ suitably modified with the inventive principles discussed herein. The terminal (203) and system controller (205), coupled together by switch port (202) operate together to communicate messages with destination addresses for various messaging units (235, 237) from the terminal (203) to the system controller (205) or various responses, in the case of a two-way system, back to the terminal (203), thus to the PSTN (201) and the originator. The region wide system controller (101), the home system controller (106), the intermediate system controller (110), and the diverted system controller (112) are examples of the system controller (205).

The messaging system (200) includes, coupled to the controller (205), via a transmitter port (206), by the outbound network channel (207), a plurality of transmitters with five depicted as a first through 5th transmitter (211 . . . 215). The transmitters are available, for example, as Motorola NUCLEUS II™ transmitters or from other suppliers. The outbound network channel (207) is preferably leased telephone lines but may be any suitable media operating with any suitable networking or communication protocol including a radio or satellite link. The system, specifically controller and transmitters are arranged and constructed and operate to provide coverage and service in one or more geographic areas or service areas such as the region wide area or home area mentioned above. It is understood that the FIG. 2 system is exemplary only and that much other equipment not here shown nor here relevant may be required in a practical system.

Additionally, the messaging system (200), when a two-way system, includes, coupled to the system controller (205), via a receiver port (210), by a network channel (209), a plurality of base receivers, such as four depicted base receivers (217–220). The network channel is preferably leased telephone lines or any other suitable network link with the bandwidth necessary for the traffic expected on the channel. Typically at least some of the base receivers will be deployed at geographic locations different from the transmitters and typically more receivers are deployed than transmitters.

Generally the messaging system is a scheduled system using a protocol such as the FLEX™ one-way or ReFLEX™ two-way protocols by Motorola where all messages outbound or inbound are transmitted within time slots in a time frame on an outbound or inbound channel (223, 229) each normally a different radio frequency. Typically within a given system all transmitters operate on the same outbound frequency or channel and often in a simulcast (nearly identical launchtime) mode. In contrast systems providing overlapping coverage such as the home and region wide systems will normally operate on a different channel. The system controller provides control of the system including scheduling outbound or inbound messages for messaging units that are registered on or subscribe to the system's services. The system controller (205) is responsible for maintaining the schedule, designating what channel(s) if need be and respective transmitter(s) or radio frequency(ies) and when within the overall schedule for each channel, a message for a messaging unit will be transmitted, notifying messaging units of the time slot where they will receive messages and, if two way units, during what inbound time slot they are expected to acknowledge receipt of the message and what inbound slots are available for volitionally originated messages, according to a slotted ALOHA contention algorithm.

The outbound messages are forwarded to the transmitters for subsequent transmission to one or more messaging units, such as the depicted messaging units (MU) (235, 237) in accordance with the system protocol at a particular time on the forward or outbound radio channels (225). Messages originating at the messaging unit (235), either volitionally as in a registration request or responsive to a received message, such as an acknowledgment, are coupled by the reverse or inbound radio channel (229) to one or more of the base receivers where they are forwarded or relayed to the system controller on the inbound or network channel (209). The system controller may use these inbound messages for scheduling decisions, such as repeats, may forward them to the terminal, if, for example, they are intended for a user destination, or may use them to perform various traffic analysis and system management or configuration functions.

Referring to the more detailed diagram of the system controller (205), the operation and basic structure of the controller will be explained. As above noted the controller or messaging system controller is adapted for scheduling messages on a channel or an operating channel. The messages are intended for or addressed to and scheduled for a specific selective messaging unit. The messaging system controller includes a processor (231) that is, preferably based on a 32 bit SuperSPARC microprocessor designed and distributed primarily by Sun Microelectronics.

The processor (231) is coupled to the various input output ports, specifically switch, transmitter, and receiver ports (202, 206, 210) and further coupled to a memory (233). The memory is a combination of disk based and RAM based storage suitable for storing all operating software as well as database information required by the system controller (205). In the exemplary diagram of FIG. 2 the controller is shown as a single entity. However it is understood that the controller and the terminal (203), either or both, may be composed of distributed terminal or distributed controller functions or resources and may be either collocated or located at a plurality of physical locations. This situation would likely be encountered in a large paging system such as the systems of FIG. 1. that included some form of roaming capability. Similarly while the FIG. 1 depiction shows various controllers or system components all of these functions may be resident at one location and may be handled by one controller or gateway or switch depending on system loading and complexity. For the remainder of our discussion it is assumed that FIG. 2 depicts two systems having two different coverage areas. One system will be referred to as the home system and includes transmitters one and two (211, 212) and operating channel (223), and the second system including transmitters three, four, and five (213, 214, 215) and operating channel (225) will be referred to as another, diverted, remote, region wide, etc. system as the circumstances and explanations require.

In these roaming systems a major task for the controller is coordination of where and when the message is scheduled with the actual location and clock of the intended messaging unit. For example if messaging unit (235) travels from a location near its home system and transmitter 1 (211) to a remote location near to or within the coverage area of another system, such as transmitter 3 (213), some methodology is needed to properly deliver messages without wasting system capacity. These systems operate on different frequencies such as channels (223, 225) and do not have overlapping coverage at the remote location. The system controller and the unit must somehow recognize that messages must be delivered by the other system on the respective operating frequency of that system. Minimizing undue waste of system capacity mandates that the message not be transmitted on all systems, rather efficient utilization of system capacity requires that the message be transmitted only to the location where the messaging unit is likely to be and the system having the smallest coverage area that includes that location should be used.

The system controller (205) accomplishes this task, after having been informed usually by way of a telephone call that a user has certain location expectations, such as a flight to a given locale at a certain time. More specifically the processor (231) schedules a first message addressed to or for the selective messaging unit on a first channel, such as channel (223), where the first message includes an indication, preferably, a channel priority indication that corresponds to the first channel. In the preferred form this indication is an affirmative indication or order to the addressed selective messaging unit to leave or discontinue monitoring the first channel and to scan through a list of channels in search of a second channel. The underlying premise being that if the unit looks for a better channel or alternative channel, such a channel will be found. For example, the system controller (205) may schedule the first message for the selective messaging unit to be sent by transmitter 1 (211) on the first or outbound channel (223). Thereafter the processor (231) schedules a second message and subsequent normal paging messages on at least another channel, for example transmitter 3 (213). In fact system operators may determine that greater customer satisfaction results if the subsequent normal paging messages are sent on multiple systems or a plurality of channels, such as the home system and remote system at least for a small time period surrounding the expected time the user will arrive in the other system. For example, when reasonable travel delays occur, the user may still expect to receive messages original plans notwithstanding.

The transmitter port (206) of the system controller (205) provides for coupling the first message and the second message and all other messages to the corresponding transmitters. The second message for this example is transmitted on at least one radio frequency that is different, thus corresponding to another system, from the frequency the first message, corresponding for example to the home system, was sent or transmitted on. The channel priority indication of the first message induces the messaging unit to scan for a second channel from the plurality of channels. The messaging unit (235) will continue to monitor and thus receive messages on the second channel so long as the channel is available or until a message with the indication is received.

Figure 4:
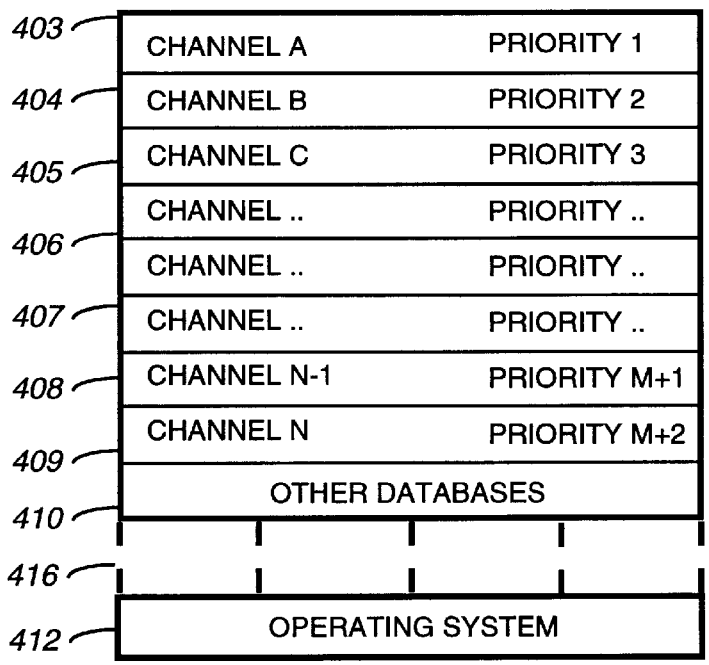
FIG. 4 is a illustrative map of contents of a memory suitable for use in the FIG. 3 selective messaging unit.

The memory (233) of the system controller (205) is used to retain information on a list of all the channels used by the plurality of transmitters that are managed by the system controller (205). The list of potential operating channels for a selective messaging unit is a subset of the list of channels used by the system controller (205) and is usually determined at the time the selective messaging unit is activated or when service is originally subscribed to. The reader is referred to the FIG. 4 depiction of an illustrative map of contents of memory (401). This map generally applies to either the memory (233) of the system controller or the memory (321) of a selective messaging unit. In either case the memory contains the list of potential operating channels (Channel A thru Channel N) (403–410) for the unit. In addition to the list of channels the memory may include the operating system (412), other databases (414), and other functions (416). The memory, preferably also contains, associated with channels (Channel A thru Channel N), their corresponding priority (Priority 1 thru Priority M+2). Upon activation the selective messaging unit is provided with an operating channel, for example channel (223) that usually has a higher priority than other channels in the list. This higher priority channel is the outbound frequency or channel for the home location (103) and may occupy the channel A (403) on "top" location in memory. Other operating channels would have different and usually lower levels of channel priority based on the implementation scheme of the present disclosure.

Figure 5:
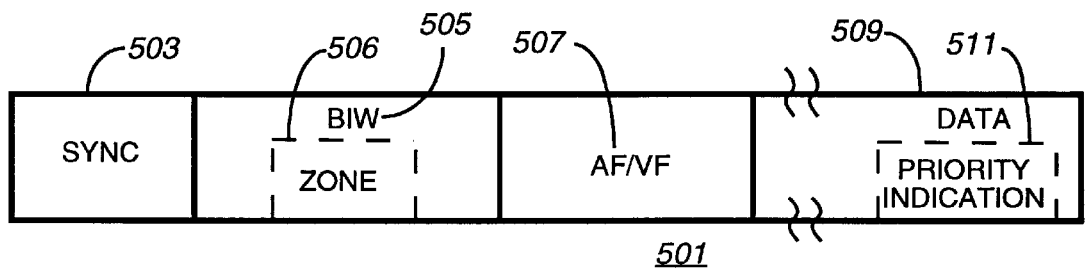
FIG. 5 is a exemplary protocol diagram.

When the home system controller (103) sends messages to the selective messaging unit that effect channel acquisition, the message includes information depicted in the exemplary protocol diagram (501) shown in FIG. 5. The synchronization or sync (503) provides for synchronizing the incoming signal and the selective messaging unit and is well known. The data (503) portion of the message typically includes information intended to be conveyed to the user of the selective messaging unit. The Block Information Words or BIW (505) is used by the system controller (205) to inform the selective messaging unit of various system configuration parameters. Included in the BIW is a zone (506) that represents, for example, the home, remote, roaming, or diverted location of the selective messaging unit. The next field in the message is an address field (AF) and a vector field (VF) (507). This field will have an address that corresponds to a selective messaging unit and a corresponding vector that points to a location in the data or message field (509). At this location in the data field the indication (511) or priority indication will, preferably, be found. This indication may take various forms as explained below. In the preferred form this indication is an affirmative order to the selective messaging unit to go scan for a second channel. In alternative forms the indication may include information that alters the priority of the channels in the memory of the selective messaging unit. The indication or channel priority indication may also provide temporal information, such as leave the channel at a particular time of day or frame number. The indication including timing can include various combinations such as leave channel before or after certain times. Additionally the indication may simply order the selective messaging unit to remain on the channel.

As an example of how some of these indications may be used by a system operator consider the circumstances where the messaging unit (235) travels from a location proximate transmitter 1 (211) to a location proximate transmitter 3 (213). Assuming these transmitters operate on different frequencies but have overlapping coverage areas such as the home area (103) and the intermediate area (105), the system controller and the messaging unit must somehow agree how or on what system using what transmitter messages will be delivered. The processor (231) accomplishes this task, after having been informed that a user has certain location expectations, such as a flight to a given locale at a certain time, by scheduling a first message for the selective messaging unit (235) on a first channel, such as channel (223) from transmitter 1 (211), where the first message includes a channel priority indication corresponding to the first channel. The channel priority indication may also be used to informs the messaging unit (235) that the first channel is valid for a predetermined period of time after the first message is sent. Upon lapse of this period of time the unit will scan for a second channel. The channel priority indication also adjusts, including selectively eliminating some channels and thus leaving a plurality of channels, the channel priority indication or priority of the list of potential operating channels that the messaging unit has at its disposal. In this case the priority indication corresponding to transmitter 3 (213) or specifically channel (225) is increased to a priority higher than channel (223). When the unit scans it will find or detect channel (225) and use that channel as the operating channel for further monitoring.

As a further example consider again a messaging unit traveling the hypothetical path (115) and how a system controller, using the inventive principles such as the indication or priority indication disclosed herein, would schedule messages and thus discriminate between locations (100, 103, 105, 107). Prior to departure from the home area, point (116), the messaging unit would continuously receive messages on the home system (103) and its corresponding first channel, such as channel (223). At the appropriate time derived from the users plans, the controller in location (103) will schedule and send a first message including a corresponding priority indication on the outbound radio channel (223) to the selective messaging unit. This priority indication will tell the selective messaging unit that the home channel is no longer valid, possibly at a certain time and can increase the priority of the region wide system. At the time the unit would scan and select the region wide channel and the controller would schedule messages on that channel. This corresponds to the point (117) on path (115). As the selective messaging unit proceeds or more specifically as time passes and the system controller expects the unit to be at the diverted or remote location or coverage area (107), the processor (231) of the system controller (205) will schedule a message including a corresponding priority indication on the region wide channel. The indication can dictate that the selective messaging unit will scan for the second channel from a definitive start time until a specific stop time. Again responsive to the priority indication, the unit discontinues monitoring the region wide channel and scans for an intermediate operating channel. When the unit is within range of the diverted coverage area (107), the scanning operation would select the corresponding channel for the operating channel. The channel priority indication can also dictate that the region wide channel will be valid until a particular time. In any event, since the system operator cannot be certain when the selective messaging unit, if it is a one way unit, arrives at or within the diverted coverage area (107) it may be desirable to continue to provide messages on the previous or region wide system even after messages are being sent on the diverted system, at least for a short time period. Additionally a message with the priority indication may need to be repeated on the previous or home system. Continuing with path (115) when the selective messaging unit is expected to leave the diverted location (107) again as indicated by a phone call to the home system and travels to the intermediate location, point (119), a message is scheduled and transmitted on the diverted or remote system that includes an indication directing the unit to scan its channel list.

The indication or channel priority indication in this message can dictate that the diverted channel will be valid in the diverted location (107 of FIG. 1) until a particular time. The indication may also indicate that the diverted channel will not be valid after a particular span of time. When the subscriber is going to the intermediate location (105), the messaging unit will have the ability to receive messages from both systems (105,107) while in the overlapping coverage area (see FIG. 1). To facilitate resolution of which system the selective messaging unit should monitor, and thus where messages should be scheduled, the selective messaging unit must at least temporarily erase the diverted channel from its channel list or at the optional times indicated by the indication drastically reduce its priority and increase the priority of the intermediate channel until it exceeds the remote channel priority and the region wide priority. This done, the scanning operation will detect the intermediate system. A similar situation will be encountered as the path is traversed from point (119) to point (116). As the reader may now appreciate by selectively using or applying the various parameters of the indication, a system and selective messaging unit can readily coordinate activities required for roaming thus minimizing undue waste of system resources, as well as, avoiding the excessive battery drain at the selective messaging unit due to unnecessary scanning such as may be experienced, for example, in selective messaging units that perform essentially constant (background) scanning.

As a review, it is clear from the above discussions that the messaging system controller or controller may elect, via the processor, to schedule messages on each channel of a plurality of channels. This plurality of channels is selected from the list of channels that a messaging unit is programmed typically at activation to receive. This scheduling occurs after the message with the indication causing the unit to scan for another operating channel has been scheduled and sent at least for a time period during which the controller is uncertain about the exact location of the unit. The memory of the messaging system controller must store a list of potential operating channels for each selective messaging unit that it serves or for which it schedules messages. The messaging system controller prior to scheduling the message with the indication or priority channel indication must formulate the channel priority indication to deal with the particular circumstances at hand, for example, to correspond to a relative priority of channels within the plurality of channels. The formulation must consider as above noted where the messaging unit was receiving service and where the unit next expects service. For example, whether the subsequent messages are to be scheduled on a channel for a diverted location, a previous location, or intermediate location, etc. in addition to when or what time these messages should be scheduled.

Figure 3:
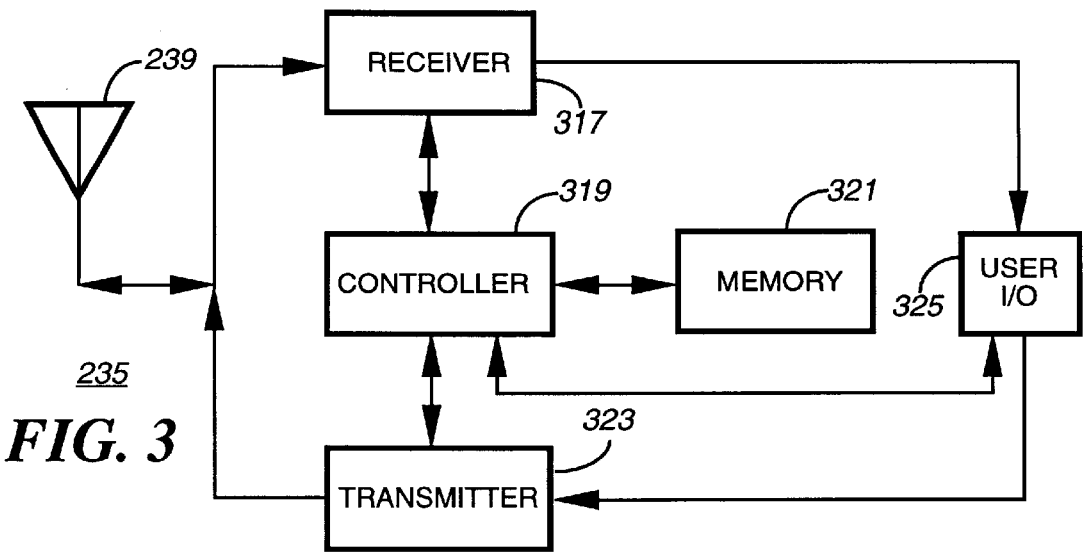
FIG. 3 is a more detailed block diagram of a selective messaging unit suitable for use in the FIG. 2 messaging system and in accordance with the instant invention.

The reader is referred to the FIG. 3 block diagram of a selective messaging unit, such as unit (235) for the following discussion. Such selective messaging units are available from Motorola and other suppliers and are commonly referred to as pagers. The readily available pagers would need to be modified in accordance with the principles disclosed herein and this modification would normally be a change in operating system readily implemented by one skilled in the art in view of the principles herein. FIG. 3 depicts a selective messaging unit arranged and constructed for selecting an operating channel. The unit includes an antenna (239), coupled to a receiver (317) and a transmitter (323). The antenna (239) operates to absorb radio signals and couple them to the receiver (317) or alternatively to radiate radio signals coupled to the antenna from the transmitter. The reader will appreciate that the transmitter is available or part of the selective messaging unit only when the unit is a two-way messaging unit. The user I/O (325) is coupled to the receiver and when present the transmitter and represents the medium, such as displays and pushbuttons, by which the selective messaging unit and the user communicate, in appropriate formats, messages and, in the case of a two-way messaging unit, responses. The receiver includes generally known elements such as filters, amplifiers, mixers, frequency generation units or synthesizers, demodulators, decoders, and the like and is coupled to and under the control of a controller (319). The controller programs the synthesizer thus tuning the receiver to and allowing it to operate to monitor a channel and receive various messages on that channel. Once a message is decoded or partly decoded the receiver together with the controller can check the address of that message with the address of the selective messaging unit. If there is a match the message is intended for or addressed to this messaging unit. The selective messaging unit of interest for the present disclosure has been modified from the normal pager such that the controller is arranged for detecting as part of the message intended for the unit, an indication, such as discussed above. The controller in response to the indication causes the receiver to discontinue monitoring the first or original operating channel and then scan for a second channel to use as the operating channel. This is done by reprogramming a synthesizer for one or more new channel frequencies and looking for activity such as the sync (503) portion of messages.

Further included in the selective messaging unit, coupled to the controller (319), is the memory (321) used for storing a list of potential operating channels along with some token of there priority for use as an operating channel. The list includes the original or first channel and the second channel all as previously discussed with reference to FIG. 4. The indication may further include a priority command and the controller will operate to modify the list, preferably the token designating priority, in accordance with this priority command thus providing a modified list. This indication may further specify a time constraint for the discontinuing step or even a time constraint for modifying or changing the channel list. Once the selective messaging unit receives the indication to discontinue monitoring the first channel, the receiver (317) as directed by or in cooperation with the controller (319) scans the channels of the modified list to provide a second channel or operating channel. As the selective messaging unit traverses a hypothetical path of travel as previously discussed with reference to FIG. 1, the receiver (317) and the controller (319), responsive to an appropriate indication and the particular circumstances, work together to scan for and select a channel, second channel, or operating channel for previous, intermediate, and diverted locations. Under some circumstances such as equal priority channels where a unit is otherwise unable to resolve a proper operating channel, it can be advantageous for the indication to be an affirmation of the present operating channel thus avoiding unnecessary scanning.

Figure 6:
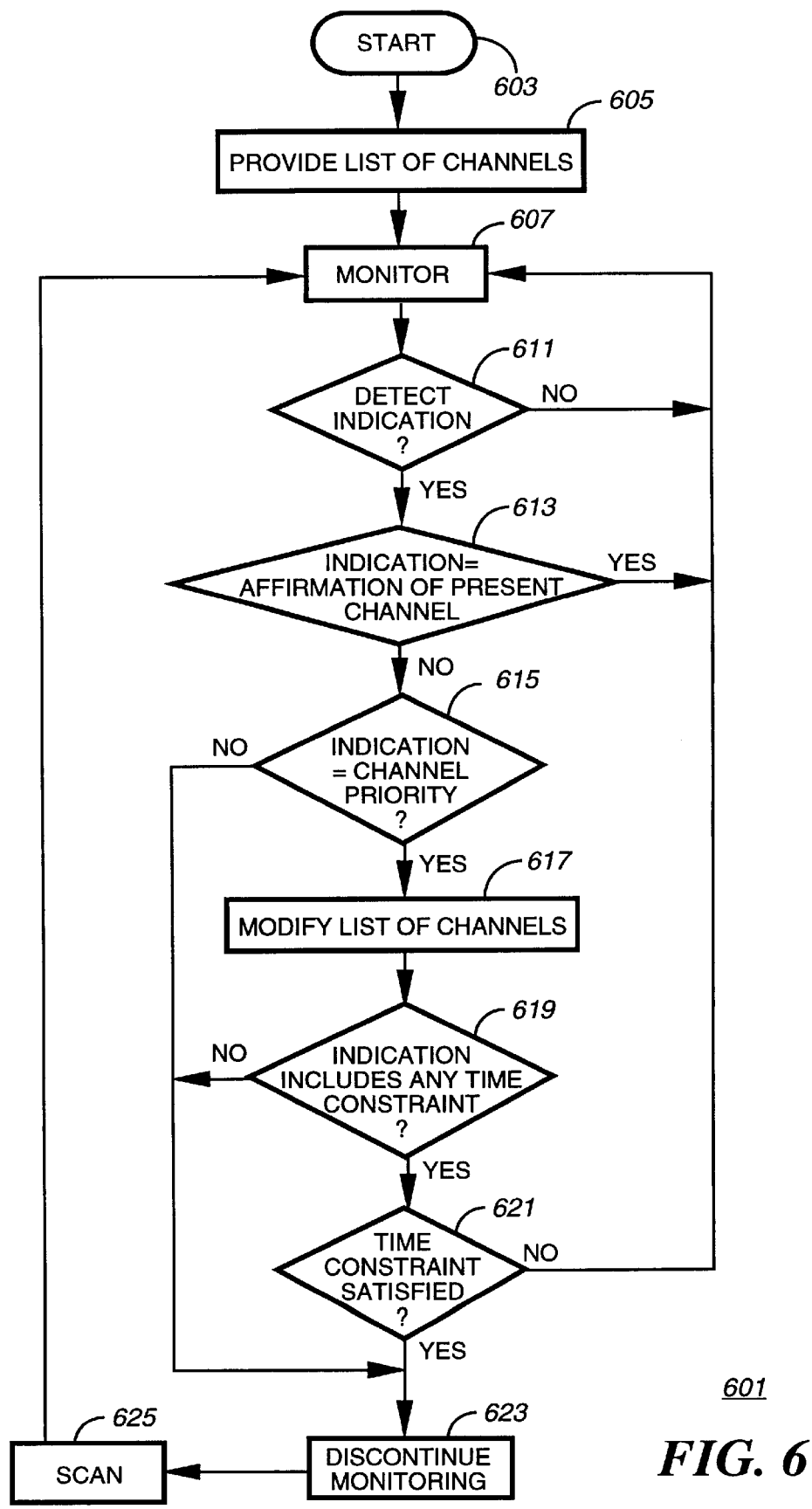
FIG. 6 is a flow chart of a preferred method embodiment in accordance with the present invention.
Figure 7:
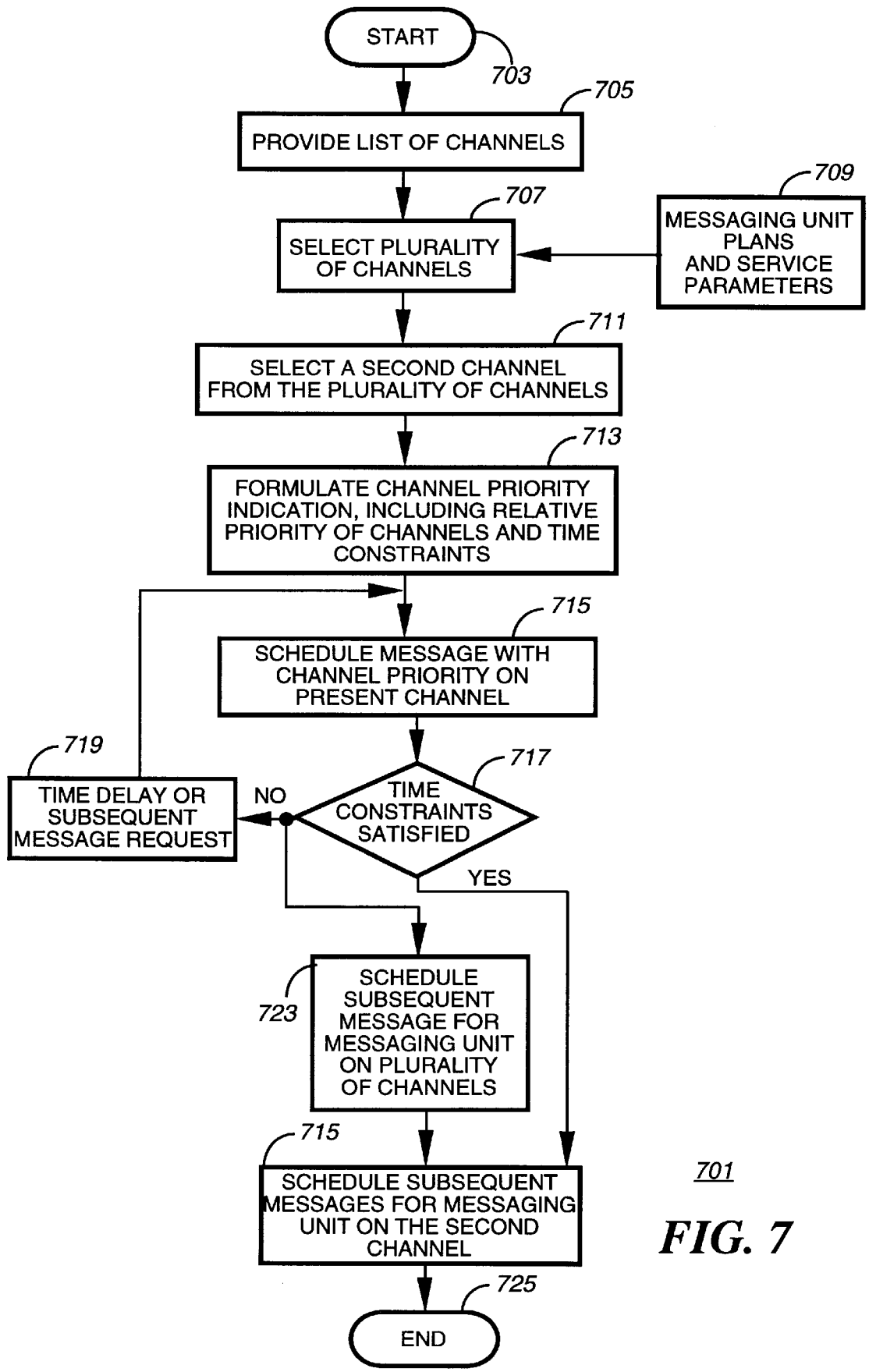
FIG. 7 is a flow chart of an alternative preferred method embodiment in accordance with the present invention.

Referring to FIG. 6, a process or method of selecting an operating channel for a selective messaging unit is depicted. The method begins or starts at (603) after which step (605) provides a list of potential operating channels that is preferably a list received at, for example, activation. Next at step (607) monitoring a first channel, from this list, for a message intended for or addressed to this selective messaging unit occurs. Step (611) detects or tests for, as part of the message from step (607) an indication or priority indication. If no such indication is found the process continues to monitor the first or initial operating channel to check for this indication. If an indication is found at step (611), step (613) tests to see whether the indication is an affirmation of the present channel and if so step (607) is repeated and if not the process continues at step (615). Step (615) looks or tests whether a priority command or channel priority indication corresponding to the list of potential operating channels in the scan list and is included in the found or detected indication from step (611). If the indication is a priority command, step (617) operates to modify the list of channels and their corresponding priorities in accordance with the indication from step (611). If the step (615) test is negative or after step (617) is performed, step (619) is performed and the indication is tested to determine whether any time constraint is included. If this test is positive, step (621) checks whether the time constraint is satisfied. If not, the process returns to step (607) and continues to monitor the present channel. If the time constraint is satisfied at step (621) or none was included at step (619), step (623) operates to discontinue monitoring the present channel and step (625) initiates a scan of the channel list, as modified so, to find or select a channel or the operating channel. After step (625) the monitoring step (607) is repeated. The channel list and contents is exemplified by the list discussed above with reference to FIG. 4. The indication is exemplified by the FIG. 5 depiction of associated discussion. Referring to FIG. 7, a process or method (701) of scheduling messages on an operating channel for a selective messaging unit is depicted. The method begins or starts at (703) after which, at step (705), the selective messaging system is provided a list of operating channels that can be used to schedule messages (705). Then, step (707) with reference to a messaging unit plan and various service parameters selects a plurality of channels corresponding to the selective messaging unit. Step (711) then selects a second channel from this plurality of channels when the second channel preferably, corresponds to a destination area or system for the selective messaging unit. Step (713) then formulates an indication or channel priority indication that includes, when needed, a relative priority of the channels, as well as, any time constraints, such as when the present channel is no longer valid, etc. Step (715) schedules a message with the channel priority indication on the present channel after which step (717) determines whether time constraints are satisfied. Note: once the scheduled delivery time of the message by the selective messaging system is reached, the message is transmitted with the appropriate channel priority indication destined for the selective messaging unit. If not step (719) introduces a time delay where a subsequent message must be delivered and then a subsequent message needs to be delivered if it is scheduled on all or a subset of the plurality of channels. If the time constraints are satisfied at step (717) or after step (723), subsequent messages for the selective messaging unit are scheduled on the second channel at step (721) and the process ends at step (725). It will be advantageous if the plurality of channels includes previous location or intermediate location.

It will be appreciated by those of ordinary skill in the art that the apparatus and methods disclosed provide various inventive techniques for effecting channel acquisition and thus facilitating roaming service for a messaging unit. The channel acquisition apparatus and methods discussed have improved the ability to automatically allow selective messaging systems and selective messaging units to modify and effect operating channel acquisition over known techniques. This has been done without compromising the accuracy of messaging and without otherwise burdening processing resources in either the system controller or the selective messaging unit. These inventive structures and methods may be readily and advantageously employed in a selective messaging system, selective messaging unit, or other communications devices or system.

The inventive principles disclosed herein allow roaming capability or service and lower battery consumption in selective messaging units than those performing background scanning. Further a reduction in the number duplicate transmissions among selective messaging systems is provided thus avoiding an unnecessary drain on system capacity. Hence, the present invention, in furtherance of satisfying a long-felt need of messaging systems, readily facilitates, roaming service and load management as well as low power consumption selective messaging units by providing methods and apparatus for automatically and readily effecting channel acquisition that are practical to implement from a physical, economic and power source perspective.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. In a selective messaging unit a method of selecting an operating channel, said method including the steps of:

providing a list of potential operating channels, said list including a first channel and a second channel;

monitoring said first channel for a message addressed to the selective messaging unit;

detecting as part of said message an indication further including a priority command and modifying said list in accordance with said priority command to provide a modified list during said step of monitoring;

discontinuing, responsive to said indication, said step of monitoring; and then scanning for said second channel to use as the operating channel.

2. The method of claim 1 wherein said step of discontinuing is performed at a time corresponding to information within said indication.

3. The method of claim 1 wherein said step of scanning further includes scanning channels corresponding to said modified list to provide said second channel.

4. The method of claim 3 wherein said step of scanning channels includes scanning a channel for an intermediate location.

5. The method of claim 3 wherein said step of scanning channels includes scanning a channel for a diverted location.

6. The method of claim 3 wherein said step of scanning channels includes scanning a channel for a previous location.

7. In a selective messaging system a method of scheduling messages on an operating channel for a selective messaging unit, the method including the steps of:

first scheduling a first message addressed to the selective messaging unit on a first channel, said first message including a channel priority indication corresponding to said first channel; and second scheduling a second message for said selective messaging unit on a second channel, said second channel selected as the operating channel from a plurality of channels as an alternative to said first channel.

8. The method of claim 7 wherein said step of second scheduling said second message includes scheduling said second message on each channel of said plurality of channels.

9. The method of claim 7 wherein said step of second scheduling is performed at a time determined to correspond to said channel priority indication.

10. The method of claim 7 wherein said step of second scheduling includes scheduling said second message on a channel for an intermediate location.

11. The method of claim 7 wherein said step of second scheduling includes scheduling said second message on a channel for a previous location.

12. The method of claim 7 wherein said step of second scheduling includes scheduling said second message on a channel for a diverted location.

13. The method of claim 7 further including a step of providing a list of potential operating channels for the selective messaging unit, said list including said plurality of channels.

14. The method of claim 13 wherein said step of first scheduling further includes formulating said channel priority indication to correspond to a relative priority of channels within said plurality of channels.

15. A selective messaging unit arranged and constructed for selecting an operating channel and comprising in combination:

a memory for storing a list of potential operating channels, said list including a first channel and a second channel a receiver for monitoring said first channel for a message addressed to the selective messaging unit; and a controller, coupled to said receiver, for detecting as part of said message an indication further including a priority command and modifying said list in accordance with said priority command to provide a modified list and responsive thereto causing said receiver to discontinue monitoring said first channel and then scan for said second channel to use as the operating channel.

16. The selective messaging unit of claim 15 wherein said receiver discontinues monitoring said first channel at a time corresponding to information within said indication.

17. The selective messaging unit of claim 15 wherein said controller cooperatively with said receiver scans channels corresponding to said modified list to provide said second channel.

18. The selective messaging unit of claim 17 wherein said controller together with said receiver scans a channel for a diverted location.

19. The selective messaging unit of claim 17 wherein said controller together with said receiver scans a channel for a previous location.

20. The selective messaging unit of claim 17 wherein said controller together with said receiver scans a channel for an intermediate location.

21. A messaging system controller for scheduling messages on an operating channel for a selective messaging unit, the messaging system controller comprising in combination:

a processor for scheduling a first message addressed to the selective messaging unit on a first channel, said first message including a channel priority indication corresponding to said first channel;

said processor then scheduling a second message for said selective messaging unit on a second channel, said second channel selected as the operating channel from a plurality of channels as an alternative to said first channel; and a transmitter port for coupling said first message and said second message to corresponding transmitters.

22. The messaging system controller of claim 21 wherein said processor schedules said second message on each channel of said plurality of channels.

23. The messaging system controller of claim 21 wherein said processor schedules said second message on a channel for a diverted location.

24. The messaging system controller of claim 21 wherein said processor schedules said second message on a channel for a previous location.

25. The messaging system controller of claim 21 wherein said processor schedules said second message on a channel for an intermediate location.

26. The messaging system controller of claim 21 wherein said processor schedules said second message at a time determined to correspond to said channel priority indication.

27. The messaging system controller of claim 21 further including a memory for storing a list of potential operating channels for the selective messaging unit, said list including said plurality of channels.

28. The messaging system controller of claim 27 wherein said step of first scheduling further includes formulating said channel priority indication to correspond to a relative priority of channels within said plurality of channels.

* * * * *